(12) United States Patent
Xu et al.

(10) Patent No.: US 11,024,876 B2
(45) Date of Patent: Jun. 1, 2021

(54) COMPOSITE MEMBRANE COMPRISING SOLID ELECTROLYTE, METHOD OF MAKING SAID COMPOSITE MEMBRANE, AND ELECTROCHEMICAL CELL COMPRISING SAID COMPOSITE MEMBRANE

(71) Applicant: Giner, Inc., Newton, MA (US)

(72) Inventors: Hui Xu, Acton, MA (US); Jarrod D. Milshtein, Cambridge, MA (US); Katherine Harrison, Arlington, MA (US); Mario Moreira, Hudson, MA (US); Brian Rasimick, Boston, MA (US)

(73) Assignee: GINER, INC., Newton, MA (US)

(*) Notice: Subject to any disclaimer, the term of this patent is extended or adjusted under 35 U.S.C. 154(b) by 85 days.

(21) Appl. No.: 15/801,118

(22) Filed: Nov. 1, 2017

(65) Prior Publication Data
US 2018/0166741 A1    Jun. 14, 2018

Related U.S. Application Data

(60) Provisional application No. 62/415,603, filed on Nov. 1, 2016.

(51) Int. Cl.
*H01M 10/0562* (2010.01)
*H01M 10/052* (2010.01)
(Continued)

(52) U.S. Cl.
CPC ......... *H01M 10/0562* (2013.01); *H01M 4/02* (2013.01); *H01M 4/13* (2013.01);
(Continued)

(58) Field of Classification Search
CPC .. H01M 10/056; H01M 10/0562; H01M 4/13; H01M 10/052; H01M 10/0486; H01M 4/02; H01M 2004/027; H01M 2004/028
See application file for complete search history.

(56) References Cited

U.S. PATENT DOCUMENTS 4,247,499 A * 1/1981 Glugla .................... B29C 70/64
                                                    264/104
4,604,177 A    8/1986 Sivilotti
(Continued)

OTHER PUBLICATIONS

Braga et al. "Novel Li3ClO based glasses with superionic properties for lithium batteries." J. Mater. Chem. A., 2014, 2, 5470-5480 (Year: 2014).*

(Continued)

*Primary Examiner* — Michael L Dignan
(74) *Attorney, Agent, or Firm* — Kriegsman & Kriegsman

(57) ABSTRACT

A composite membrane that is suitable for use in an electrochemical cell, an electrochemical cell including the composite membrane, and a method of making the composite membrane. In one embodiment, the composite membrane includes a porous support and a solid electrolyte. The porous support is a unitary structure made of a polymer that is non-conductive to ions. The porous support is shaped to include a plurality of straight-through pores. The solid electrolyte has alkali ion conductivity and preferably completely fills at least some of the pores of the porous support. A variety of techniques may be used to load the solid electrolyte into the pores. According to one technique, the solid electrolyte is melted and then poured into the pores of the porous support. Upon cooling, the electrolyte re-solidifies, forming a monolithic structure within the pores of the porous support.

11 Claims, 17 Drawing Sheets

(51) Int. Cl.
H01M 4/02 (2006.01)
H01M 10/04 (2006.01)
H01M 4/13 (2010.01)

(52) U.S. Cl.
CPC ..... *H01M 10/0486* (2013.01); *H01M 10/052* (2013.01); *H01M 2004/027* (2013.01); *H01M 2004/028* (2013.01)

(56) References Cited

U.S. PATENT DOCUMENTS

| | | | |
|---|---|---|---|
| 4,781,995 | A | 11/1988 | Giner |
| 6,692,861 | B2 | 2/2004 | Tao |
| 6,793,711 | B1 | 9/2004 | Sammells |
| 7,807,063 | B2 | 10/2010 | Liu et al. |
| 7,867,669 | B2 | 1/2011 | Liu et al. |
| 7,947,405 | B2 | 5/2011 | Mittelsteadt et al. |
| 7,976,989 | B2 | 7/2011 | Lopez et al. |
| 8,184,436 | B2 * | 5/2012 | Campbell .......... H05K 7/20809 361/700 |
| 8,962,132 | B2 * | 2/2015 | Liu .................. C25B 13/02 252/500 |
| 9,246,188 | B2 | 1/2016 | Zhao et al. |
| 9,728,802 | B2 | 8/2017 | Mittelsteadt et al. |
| 2008/0157419 | A1 | 7/2008 | Ryu et al. |
| 2010/0151335 | A1 * | 6/2010 | Senga ............... H01B 1/122 429/322 |
| 2014/0234726 | A1 | 8/2014 | Christensen et al. |
| 2015/0024256 | A1 * | 1/2015 | Anandan .......... H01M 50/411 429/162 |
| 2015/0064606 | A1 | 3/2015 | Dekempeneer et al. |
| 2015/0349368 | A1 | 12/2015 | Arges et al. |
| 2016/0099453 | A1 * | 4/2016 | Anandan .......... H01M 10/056 429/142 |
| 2016/0181585 | A1 * | 6/2016 | Choi .............. H01M 2/1686 429/403 |
| 2016/0190640 | A1 | 6/2016 | Visco et al. |
| 2016/0211498 | A1 * | 7/2016 | Kim ................ H01M 2/1686 |
| 2016/0368777 | A1 | 12/2016 | Goodenough et al. |
| 2017/0005367 | A1 * | 1/2017 | Van Berkel ....... H01M 10/0565 |
| 2017/0025705 | A1 | 1/2017 | Miara et al. |
| 2017/0275172 | A1 | 9/2017 | Zhao et al. |

OTHER PUBLICATIONS

Epp et al. "Very fast bulk Li ion diffusivity in crystalline $Li_{1.5}Al_{0.5}Ti_{1.5}(PO_4)_3$ as seen using NMR relaxometry." Phys. Chem. Chem. Phys., 2015, 17, 32115-32121 (Year: 2015).*

Kanehori et al., "Kinetic Study on Chemical Vapor Deposition of Titanium Disulfide Thin Film," J. Electrochem. Soc., 136(5):1265-1270 (1989).

Kuwata et al., "Thin Film Batteries with $Li_3PO_4$ Solid Electrolyte Fabricated by Pulsed Laser Deposition," ECS Transactions, 16(26):53-60 (2009).

Kerman et al., "Review-Practical Challenges Hindering the Development of Solid State Li Ion Batteries," Journal of the Electrochemical Society, 164(7):A1731-A1744 (2017).

Sakuda et al., "Sulfide Solid Electrolyte with Favorable Mechanical Property for All-Solid-State Lithium Battery," Sci. Rep., 3; 2261: DOI/10.1038/srep02261, pp. 1-5 (2013).

Abstract for Kanehori et al., "Kinetic Study on Chemical Vapor Deposition of Titanium Disulfide Thin Film," Journal of The Electrochemical Society, 136(5): 1265-1270 (1989).

Choi et al., "Radio-Frequency Magnetron Sputtering Power Effect on the Ionic Conductivities of Lipon Films," Electrochemical and Solid-State Letters, 5(1): A14-A17 (2002).

Abstract for Kuwata et al., "Thin Film Batteries with $Li_3PO_4$ Solid Electrolyte Fabricated by Pulsed Laser Deposition," ECS Transactions, 16(26):53-60 (2009).

Schaefer et al., "Electrolytes for high-energy lithium batteries," Applied Nanoscience, 2:91-109 (2012).

Jung et al., "Hybrid Solid Electrolyte Composed of Lithium Aluminum Germanium Phosphate and Poly(ethylene oxide) for All Solid-State Lithium Batteries," ECS Meeting Abstracts, 2:391 (2014).

Shigeo Kondo, "All Solid-State Lithium Secondary Battery with Highly Ion Conductive Glassy Electrolyte," pp. 199-217 of Lithium Ion Batteries: Fundamentals and Performance, edited by Wakihara et al., published jointly by Kodansha Ltd., Tokyo, Japan, and Wiley-VCH Verlag GmbH, Weinheim, Germany (1998).

U.S. Appl. No. 16/590,266, inventors Hui Xu et al., filed Oct. 1, 2019.

Xu et al., "High Temperature Alkaline Water Electrolysis," Giner, Inc., Jun. 7, 2017.

Schefold et al., "23,000 h steam electrolysis with an electrolyte supported solid oxide cell," International Journal of Hydrogen Energy, 42:13415-13426 (2017).

Mefford et al., "Water electrolysis on $La_{1-x}Sr_xCoO_{3-\delta}$ perovskite electrocatalysts," Nature Communications, 7:11053 (1-11) (2016).

Allebrod et al., "Alkaline electrolysis cell at high temperature and pressure of 250° C. and 42 bar," Journal of Power Sources, 229:22-31 (2013).

Leng et al., "Solid-State Water Electrolysis with an Alkaline Membrane," J. Am. Chem. Soc., 134:9054-9057 (2012).

Merle et al., "Anion exchange membranes for alkaline fuel cells: A review," Journal of Membrane Science, 377:1-35 (2011).

Lü et al., "Antiperovskite $Li_3OCl$ Superionic Conductor Films for Solid-State Li-Ion Batteries," Advanced Science, 3:1500359 (pp. 1-5) (2016).

* cited by examiner

COMPOSITE MEMBRANE COMPRISING SOLID ELECTROLYTE, METHOD OF MAKING SAID COMPOSITE MEMBRANE, AND ELECTROCHEMICAL CELL COMPRISING SAID COMPOSITE MEMBRANE

CROSS-REFERENCE TO RELATED APPLICATIONS

The present application claims the benefit under 35 U.S.C. 119(e) of U.S. Provisional Patent Application No. 62/415,603, inventors Hui Xu et al., filed Nov. 1, 2016, the disclosure of which is incorporated herein by reference.

FEDERALLY SPONSORED RESEARCH OR DEVELOPMENT

This invention was made with government support under Army SBIR Phase I Contract No. W56HZV-15-C-0183 entitled "Novel Solid Electrolyte Based Lithium-Sulfur Batteries," awarded by the United States Army, and NASA SBIR Phase I Contract No. NNX17CC47P entitled "High Energy Density Lithium-Sulfur Batteries with Extended Cycle Life," awarded by the United States National Aeronautics and Space Association. The government has certain rights in the invention.

BACKGROUND OF THE INVENTION

The present invention relates generally to electrolytes with alkali ion conductivity (e.g., lithium ion conductivity, sodium ion conductivity, etc.) and relates more particularly to solid electrolytes with alkali ion conductivity and to composite structures including such solid electrolytes.

Lithium-based solid electrolytes are attractive for battery applications because such solid electrolytes have the potential to protect metallic lithium anodes and to operate at high voltage to provide enhanced specific energy and power capacity. Solid electrolytes present a desirable alternative to organic liquid electrolytes as solid electrolytes improve the safety of next-generation high-energy density and high-power density batteries. In a secondary lithium battery employing a cathode containing sulfur, a lithium-based solid electrolyte should suppress the diffusion of polysulfides, thereby eliminating self-discharge due to polysulfide shuttling. Recently, the $Li^+$ conductivity of inorganic materials-based solid electrolytes has increased to more than 10 mS/cm, thus providing great opportunities in lithium battery applications.

Most inorganic solid electrolytes are initially produced as powders, which then have to be formed into a membrane separator for subsequent cell assembly. There are generally two methods of making electrolyte powders into solid electrolyte membranes. The first method involves pressing electrolyte powders at an appropriate pressure in a pellet die (see Sakuda et al., "Sulfide Solid Electrolyte with Favorable Mechanical Property for All-Solid-State Lithium Battery," *Scientific Reports*, 3:2261 (2013), which is incorporated herein by reference in its entirety). According to this method, the formed pellet may be very thick (e.g., >1 mm), thus leading to large membrane area-specific resistance in a battery. The second method involves the fabrication of thin films (<20 μm) using chemical and thermal vapor deposition (see Kanehori et al., "Kinetic Study on Chemical Vapor Deposition of Titanium Disulfide Thin Film," *Journal of The Electrochemical Society*, 136(5): 1265-1270 (1989), which is incorporated herein by reference in its entirety), radio frequency (RF) sputtering (see Choi et al. "Radio-Frequency Magnetron Sputtering Power Effect on the Ionic Conductivities of Lipon Films," *Electrochemical and Solid-State Letters*, 5(1): A14-A17 (2002), which is incorporated herein by reference in its entirety), or pulsed laser deposition (PLD) (see Kuwata et al., (2009) "Thin Film Batteries with Li3PO4 Solid Electrolyte Fabricated by Pulsed Laser Deposition," *ECS Transactions*, 16(26):53-60 (2009), which is incorporated herein by reference in its entirety). The aforementioned second method uses sophisticated equipment, requires substantial time, and is difficult to scale-up for mass production. For both methods, an electrolyte membrane made from inorganic powders is brittle and does not provide mechanical flexibility (see Schaefer et al., "Electrolytes for high-energy lithium batteries," *Applied Nanoscience*, 2:91-109 (2012); Jung et al., "Hybrid Solid Electrolyte Composed of Lithium Aluminum Germanium Phosphate and Poly(ethylene oxide) for All Solid-State Lithium Batteries," *ECS Meeting Abstracts*, 2:391 (2014); and Eds. Wakihara et al., "Lithium Ion Batteries: Fundamentals and Performance," Kodansha Ltd., Tokyo, Japan, page 215 (1998), all of which are incorporated herein by reference in their entireties). As a result, membrane handling, shaping, and cell assembly present significant challenges during lithium battery fabrication.

Additional documents relating to solid electrolytes with lithium ion conductivity are discussed below.

For example, in U.S. Patent Application Publication No. US 2017/0005367 A1, inventors Van Berkel et al., which was published Jan. 5, 2017, and which is incorporated herein by reference in its entirety, there are disclosed electrolyte compositions that include both organic and inorganic constituent components and that are said to be suitable for use in rechargeable batteries. According to one disclosed embodiment of the aforementioned patent publication (hereinafter "the '367 publication"), there is a disclosed method of making a composite electrolyte thin film, the method including the following steps: providing a mixture that includes inorganic solid state electrolyte precursors, inorganic solid state electrolytes, binders, polymers, solvents, or combinations thereof, casting the mixture with a template, calcining the mixture with a template to form a calcined inorganic solid state electrolyte having void spaces, and back-filling the void spaces with a polymer of the type described therein, wherein the volumetric ratio of inorganic solid state electrolyte to polymer is greater than 1. In some examples, the method further includes treating the surface of the dried film to expose the inorganic solid state electrolyte at the top and bottom surfaces. The treating can include a variety of known treatment methods such as, but not limited to, radiation (e.g., ultraviolet radiation), or chemical treatment (e.g., HF exposure).

One shortcoming that has been identified by the present inventors with the approach of the '367 publication is that the solid electrolyte materials present in the thus-produced thin film are in the form of dispersed particles, as opposed to being present as a monolithic solid phase. As a result, there is not a continuous through-connection of the solid electrolyte materials across the thickness of the thin film.

In U.S. Patent Application Publication No. US 2016/0211498 A1, inventors Kim et al., which was published Jul. 21, 2016, and which is incorporated herein by reference in its entirety, there is disclosed a thin and flexible solid electrolyte for lithium-ion batteries. More specifically, according to the aforementioned patent publication (hereinafter "the '498 publication"), a lithium-ion conducting, solid electrolyte is deposited on a thin, flexible, porous alumina membrane which is placed between co-extensive facing side surfaces of a porous, lithium-accepting, negative electrode and a positive electrode formed of a porous layer of particles of a compound of lithium, a transition metal element, and, optionally, another metal element. A liquid electrolyte formed, for example, of $LiPF_6$ dissolved in an organic solvent, infiltrates the electrode materials of the two porous electrodes for transport of lithium ions during cell operation. The solid electrolyte permits the passage of only lithium ions, and the negative electrode is protected from damage by transition metal ions or other chemical species produced in the positive electrode of the lithium-ion cell.

One shortcoming that has been identified by the present inventors with the approach of the '498 publication is that the porous membrane used to support the solid electrolyte is preferably made of alumina or a lithium-conductive material. However, porous and flexible alumina, in particular, is very expensive. In addition, the approach of the '498 publication requires the use of a liquid electrolyte to infiltrate and to surround both the electrodes and the solid, electrolyte-filled membrane. As a result, this approach still suffers from some of the disadvantages associated with the use of a liquid electrolyte.

In U.S. Patent Application Publication No. US 2016/0190640 A1, inventors Visco et al., which was published Jun. 30, 2016, and which is incorporated herein by reference in its entirety, there is disclosed a standalone lithium ion-conductive solid electrolyte, methods of making and using the electrolyte, and battery cells and cell components incorporating the electrolyte. According to the aforementioned publication (hereinafter "the '640 publication"), the standalone lithium ion-conductive solid electrolyte can include a freestanding inorganic vitreous sheet of sulfide-based lithium ion conducting glass capable of high performance in a lithium metal battery by providing a high degree of lithium ion conductivity while being highly resistant to the initiation and/or propagation of lithium dendrites.

In U.S. Patent Application Publication No. US 2014/0234726 A1, inventors Christensen et al., which was published Aug. 21, 2014, and which is incorporated herein by reference in its entirety, there is disclosed a lithium battery with a composite solid electrolyte. According to the aforementioned publication (hereinafter "the '726 publication"), there are at least two layers in the composite solid electrolyte including a layer of lithium-conducting polymer or block copolymer matrix within which are embedded lithium-conducting particles of ceramic or glass, and another layer of fully dense lithium-conducting ceramic or glass. The polymer layer is between 1 nm and 50 microns in thickness. It has a volume fraction of ceramic (or glass) particles of between 0.1 and 99%. The dense ceramic layer is between 1 nm and 50 microns in thickness. There are a variety of candidate materials including, for the polymer matrix, polyethylene oxide (PEO), a block copolymer with PEO Li-conducting phase and polystyrene high-shear-modulus phase. The ceramic or glass grains in the matrix in different embodiments include Li-conducting garnets and/or Li-conducting sulfides. Li-conducting phosphates used in some embodiments include $Li_3N$, $Li_3P$, and LiPON.

One shortcoming that has been identified by the present inventors with the approach of the '726 publication is that the composite solid electrolyte layer requires two separate layers of material, one layer being a lithium-conducting polymer or block copolymer matrix within which lithium-conducting particles of ceramic or glass are embedded and the other layer being a fully dense lithium-conducting ceramic or glass. As can be appreciated, such an approach increases the thickness of the composite, which can be undesirable.

SUMMARY OF THE INVENTION

It is an object of the present invention to provide a novel composite membrane comprising a solid electrolyte.

Therefore, according to one aspect of the invention, there is provided a composite membrane suitable for use in an electrochemical cell, the composite membrane comprising (a) a porous support, the porous support being a unitary, dimensionally-stable, flexible structure made of a polymer that is non-conductive to ions, the porous support being shaped to include a plurality of pores, the pores of the porous support being straight-through pores having a length; and (b) a solid electrolyte, the solid electrolyte having alkali ion conductivity, the solid electrolyte being disposed within at least some of the pores of the porous support and forming a monolithic structure spanning the length of at least some of the pores of the porous support.

In a more detailed feature of the invention, the porous support may have a first melting temperature, the solid electrolyte may have a second melting temperature, and the first melting temperature may be higher than the second melting temperature.

In a more detailed feature of the invention, the porous support may be made of at least one polymer selected from the group consisting of polyimide, polysulfone, polyphenylene sulfide, polytetrafluoroethylene, polyether ether ketone, and polyamide-imide.

In a more detailed feature of the invention, the pores may have a pore size of about 0.1 µm to about 100 µm.

In a more detailed feature of the invention, the pores may have a pore size of about 50 µm.

In a more detailed feature of the invention, the pores may constitute about 20-80% of the porous support.

In a more detailed feature of the invention, the pores may constitute about 40-60% of the porous support.

In a more detailed feature of the invention, the porous support may have a thickness of about 1 µm to about 50 µm, preferably about 5 µm to about 50 µm.

In a more detailed feature of the invention, the solid electrolyte may completely fill substantially all of the pores of the porous support.

In a more detailed feature of the invention, the porous support may have a top surface and a bottom surface, and the solid electrolyte may completely fill substantially all of the pores of the porous support and may substantially cover at least one of the top surface and the bottom surface of the porous support.

In a more detailed feature of the invention, the porous support may have a top surface and a bottom surface, and the solid electrolyte may completely fill substantially all of the pores of the porous support and may substantially cover both the top surface and the bottom surface of the porous support.

In a more detailed feature of the invention, the solid electrolyte may have either lithium ion conductivity or sodium ion conductivity.

In a more detailed feature of the invention, the solid electrolyte may be at least one member selected from the group consisting of lithium anti-perovskite electrolytes and sodium anti-perovskite electrolytes.

In a more detailed feature of the invention, the lithium anti-perovskite electrolytes may be selected from the group consisting of $Li_3OCl$ and $Li_{3-x}M_{x/2}OA$, wherein $0<x\leq3$, wherein M is an alkaline earth metal cation dopant selected from the group consisting of $Mg^{2+}$, $Ca^{2+}$, $Sr^{2+}$, $Ba^{2+}$, and mixtures thereof, and A is a halogen dopant selected from the group consisting of $F^-$, $Cl^-$, $Br^-$, $I^-$, and mixtures thereof.

In a more detailed feature of the invention, the sodium anti-perovskite electrolytes may be selected from the group consisting of $Na_3OCl$ and $Na_{3-x}M_{x/2}OA$, wherein $0<x<0.8$, wherein M is an alkaline earth metal cation dopant selected from the group consisting of $Mg^{2+}$, $Ca^{2+}$, $Sr^{2+}$, $Ba^{2+}$, and mixtures thereof, and wherein A is a halogen dopant selected from the group consisting of $F^-$, $Cl^-$, $Br^-$, $I^-$, and mixtures thereof.

In a more detailed feature of the invention, the composite membrane may have a thickness of up to about 200 μm.

It is another object of the present invention to provide an electrochemical cell, such as a battery, comprising the above-described composite membrane.

Therefore, according to one aspect of the invention, there is provided an electrochemical cell, the electrochemical cell comprising (a) a composite membrane of the type described above, the composite membrane having two opposing surfaces; (b) a cathode, the cathode being in contact with one of the two opposing surfaces of the composite membrane; and (c) an anode, the anode being in contact with the other of the two opposing surfaces of the composite membrane.

In a more detailed feature of the invention, the electrochemical cell may be an alkali ion battery.

In a more detailed feature of the invention, the electrochemical cell may be devoid of liquid electrolyte.

In a more detailed feature of the invention, the cathode may be made of any one or more solid materials including, but not limited to, lithium cobalt oxide, lithium nickel manganese oxide, lithium manganese oxide, lithium nickel manganese cobalt oxide, lithium iron phosphate, lithium nickel cobalt aluminum oxide, and sulfur. Alternatively, the cathode may be a gaseous material, such as air or oxygen.

In a more detailed feature of the invention, the anode may be made of any one or more materials including, but not limited to, graphite, silicon, lithium metal, and lithium titanate.

It is still another object of the present invention to provide a method for making a composite membrane.

Therefore, according to one aspect of the invention, there is provided a method of preparing a composite membrane, the method comprising the steps of (a) providing a porous support, the porous support being a unitary, dimensionally stable, flexible structure made of a polymer that is non-conductive to ions, the porous support being shaped to include a plurality of pores, the pores of the porous support being straight-through pores having a length; (b) providing a solid electrolyte, the solid electrolyte having alkali ion conductivity; and (c) processing at least one of the porous support and the solid electrolyte using heat, and optionally pressure, such that the solid electrolyte is disposed within and spans the length of at least some of the pores of the porous structure.

In a more detailed feature of the invention, the porous support may have a first melting temperature, the solid electrolyte may have a second melting temperature, and the first melting temperature may be higher than the second melting temperature.

In a more detailed feature of the invention, the solid electrolyte may be at least one member selected from the group consisting of lithium anti-perovskite electrolytes and sodium anti-perovskite electrolytes.

In a more detailed feature of the invention, the processing step may comprise positioning the solid electrolyte on top of the porous support, positioning the porous support on a heating platen, and operating the heating platen at a third temperature that is above the second temperature but below the first temperature, whereby the solid electrolyte becomes a molten electrolyte that flows into and fills at least some of the pores of the porous structure, and then subjecting the molten electrolyte to cooling conditions whereby the molten electrolyte forms a monolithic solid.

In a more detailed feature of the invention, the processing step may further comprise applying pressure to the solid electrolyte during heating.

In a more detailed feature of the invention, the processing step may comprise melting the solid electrolyte in a crucible to form molten electrolyte, submerging the porous support in the molten electrolyte, and then subjecting the molten electrolyte to cooling conditions whereby the molten electrolyte forms a monolithic solid.

In a more detailed feature of the invention, the processing step may comprise melting the solid electrolyte in a crucible to form molten electrolyte, pouring the molten electrolyte over the porous substrate to fill at least some of the pores, and then subjecting the molten electrolyte to cooling conditions, whereby the molten electrolyte forms a monolithic solid.

In a more detailed feature of the invention, the processing step may comprise adding the solid electrolyte to a suitable liquid to form a slurry/solution, casting the slurry/solution mixture over the porous support, evaporating the liquid from the slurry/solution, heating the porous support and the solid electrolyte remaining from the slurry/solution, whereby the solid electrolyte forms a molten electrolyte that fills at least some of the pores, and then subjecting the molten electrolyte to cooling conditions, whereby the molten electrolyte forms a monolithic solid.

In a more detailed feature of the invention, the porous support may have a first melting temperature, the solid electrolyte may have a second melting temperature, and the first melting temperature may be lower than the second melting temperature.

In a more detailed feature of the invention, the solid electrolyte may be at least one member selected from the group consisting of lithium anti-perovskite electrolytes, LiSICON-type electrolytes, lithium sulfide electrolytes, Garnet-type lithium electrolytes, sodium anti-perovskite electrolytes, NaSICON-type electrolytes, and sodium sulfide electrolytes.

In a more detailed feature of the invention, the solid electrolyte may have a particle size, the pores may have a pore size, the particle size of the solid electrolyte may be greater than the pore size of the pores, and the processing step may comprise positioning the solid electrolyte on top of the porous support, positioning the porous support on a heating platen, operating the heating platen at a third temperature that is below the first temperature but sufficient to cause the porous support to soften with pressure, and applying pressure to the solid electrolyte and the porous support, whereby the porous support expands and the solid electrolyte penetrates and fills at least some of the pores of the porous structure, and then subjecting the porous support and the solid electrolyte to cooling conditions.

In a more detailed feature of the invention, the solid electrolyte may have a particle size, the pores may have a pore size, the particle size of the solid electrolyte may be less than the pore size of the pores, and the processing step may comprise positioning the solid electrolyte on top of the porous support, positioning the porous support on a heating platen, operating the heating platen at a third temperature that is below the first temperature but sufficient to cause the solid electrolyte to sinter, and applying pressure to the solid electrolyte and the porous support, whereby the solid electrolyte penetrates and fills at least some of the pores of the porous structure and whereby the solid electrolyte sinters, and then subjecting the porous support and the solid electrolyte to cooling conditions.

In a more detailed feature of the invention, the solid electrolyte may have a particle size, the pores may have a pore size, the particle size of the solid electrolyte may be less than the pore size of the pores, and the processing step may comprise adding the solid electrolyte to a suitable liquid to form a slurry/solution, casting the slurry/solution mixture over the porous support, evaporating the liquid from the slurry/solution, heating the porous support and the solid electrolyte remaining from the slurry/solution, whereby the solid electrolyte fills the pores and the solid electrolyte sinters, and then subjecting the porous support and the solid electrolyte to cooling conditions.

The present invention is also directed at composite membranes made by the above methods.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numeral represent like parts.

DETAILED DESCRIPTION OF THE INVENTION

The present invention is directed, in part, at a novel composite membrane comprising a solid electrolyte with alkali ion conductivity. The present invention is also directed, in part, at methods of making the composite membrane and at electrochemical cells, such as batteries, comprising the composite membrane.

Figure 1:
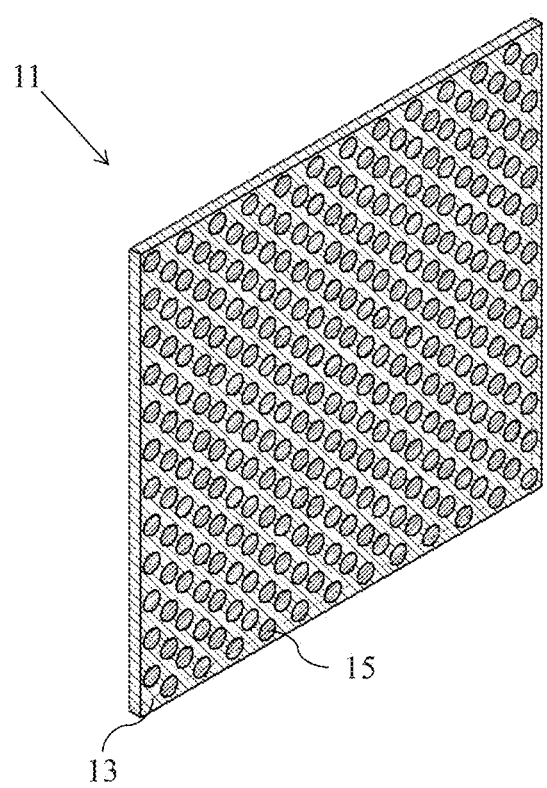
FIG. 1 is a perspective view of a first embodiment of a composite membrane comprising a solid electrolyte with alkali ion conductivity, the composite membrane being constructed according to the present invention.
Figure 2:
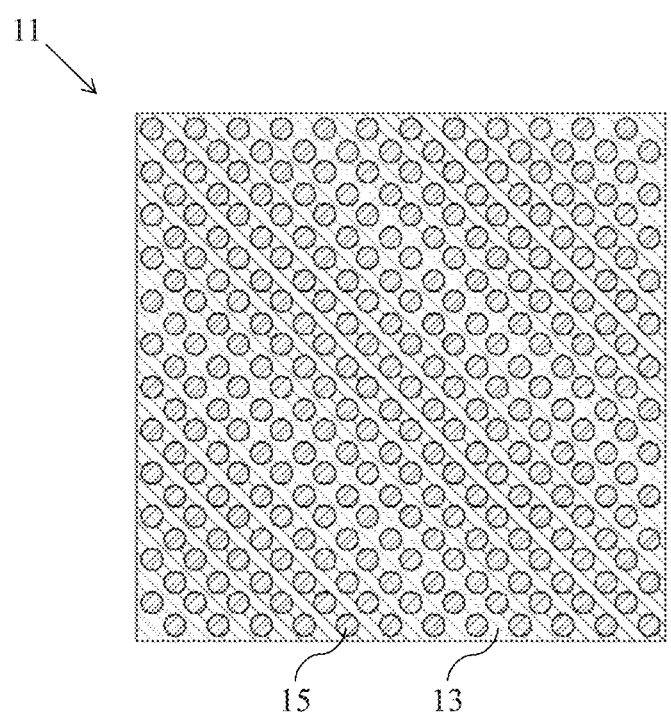
FIG. 2 is a front view of the composite membrane shown in FIG. 1.
Figure 3:
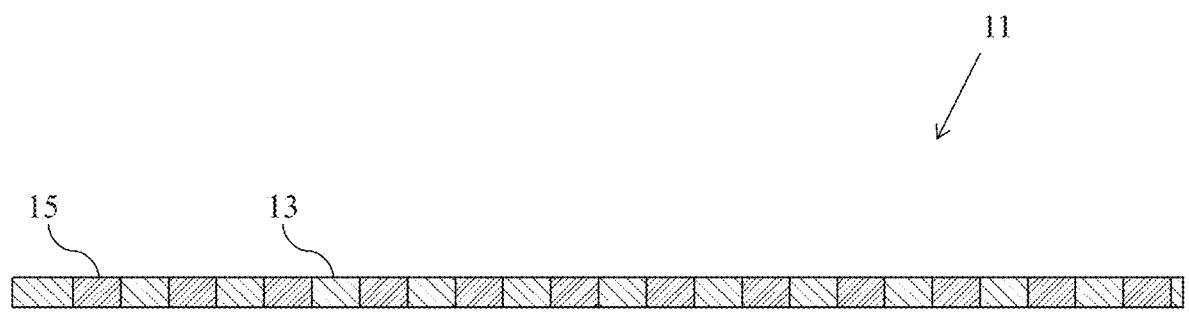
FIG. 3 is a section view of the composite membrane shown in FIG. 1.

Referring now to FIGS. 1 through 3, there are shown various views of a first embodiment of a composite membrane comprising a solid electrolyte with alkali ion conductivity, the composite membrane being constructed according to the present invention and being represented generally by reference numeral 11.

Composite membrane 11 may comprise a porous support 13 and a solid electrolyte with alkali ion conductivity 15, with solid electrolyte 15 being present within at least some of the pores of porous support 13.

Figure 4:
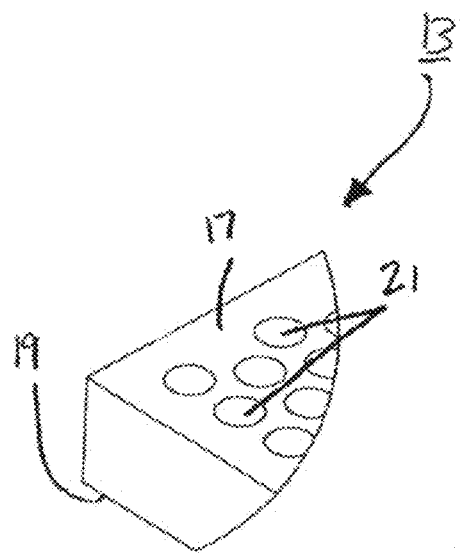
FIG. 4 is an enlarged fragmentary perspective view of the porous support shown in FIG. 1.
Figure 5:
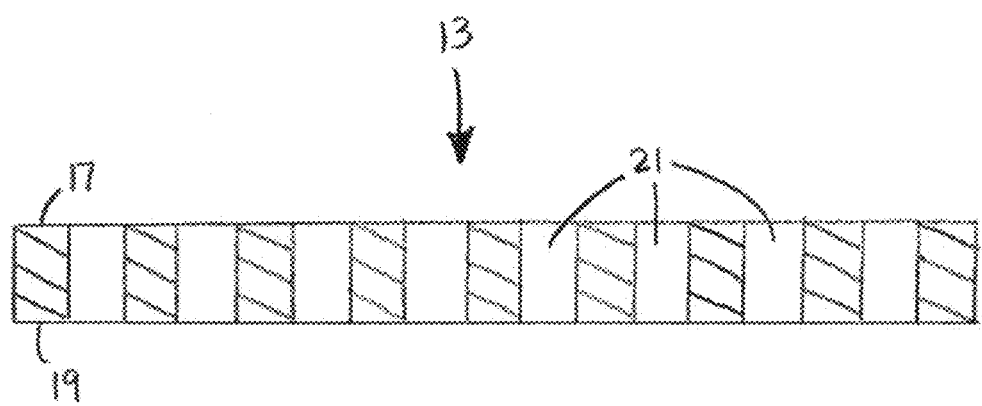
FIG. 5 is an enlarged fragmentary section view of the porous support shown in FIG. 1.

Porous support 13, which is also shown separately in FIGS. 4 and 5, may be a generally sheet-like, unitary structure. Preferably, porous support 13 is made of a solid polymeric material that is both sufficiently dimensionally-stable and flexible to permit its use in various types of electrochemical cells including, but not limited to, alkali ion batteries (e.g., lithium ion batteries, sodium ion batteries, etc.). In addition, porous support 13 is preferably made of a polymeric material that is non-conductive to ions, such as alkali ions (e.g., lithium ions, sodium ions, etc.). As will be discussed further below, in some embodiments, porous support 13 may have a comparatively higher melting temperature, at least as compared to solid electrolyte 15, so that porous support 13 may remain solid under temperatures or other conditions at which solid electrolyte 15 may be caused to liquefy. In other embodiments, porous support 13 may have a comparatively lower melting temperature, at least as compared to solid electrolyte 15, so that porous support 13 may be caused to soften at temperatures or under other conditions at which solid electrolyte 15 may remain solid. For example, in certain embodiments, porous support 13 may be made of a material that has a melting temperature of at least 250° C., preferably at least 350° C. Examples of materials suitable for use as porous support 13 in certain embodiments may include, but are not limited to, Kapton® polyimide (DuPont, Wilmington, Del.), polysulfone (PSU), polyphenylene sulfide (PPS), polytetrafluoroethylene, polyether ether ketone (PEEK), and polyamide-imide (PAI).

Porous support 13 may comprise a top surface 17, a bottom surface 19, and one or more pores 21 extending in a direct, i.e., straight-line or non-tortuous, fashion from top surface 17 to bottom surface 19 of support 13. Although pores 21 are shown in the present embodiment as having a circular cross-sectional shape, pores 21 can alternatively have any other two-dimensional cross-sectional shape including, but not limited to, ovaloid, ellipsoid, or any polygonal shape (e.g., square, rectangular, etc.). Moreover, although all of pores 21 are shown in the present embodiment as having a circular cross-sectional shape, in another embodiment, some pores 21 may have one type of cross-sectional shape and other pores 21 may have a different cross-sectional shape. Pores 21 may be constant in pore size from top surface 17 to bottom surface 19 or may vary in pore size in a regular or irregular fashion from top surface 17 to bottom surface 19 (for example, by tapering or expanding in pore size from top surface 17 to bottom surface 19). Pores 21 may be substantially identical to one another in pore size or may differ from one another in pore size. Preferably, pores 21 have a pore size in the range of about 0.1 μm to about 100 μm, more preferably about 50 μm. Pores 21 may constitute about 20-80% of porous support 13 and preferably constitute about 40-60% of porous support 13. In the present embodiment, pores 21 may be substantially identical to one another in pore size and shape and may be arranged in a uniform hexagonal pattern over substantially the entirety of support 13. However, it is to be understood that the present invention is not limited to such a pattern of pores 21 and may encompass other patterns of pores 21 including non-uniform patterns of pores 21, such as, but not limited to, patterns comprising higher concentrations of pores 21 in some areas of porous support 13 and lesser concentrations of pores 21 in other areas of porous support 13. Porous support 13 preferably has a thickness, as measured from top surface 17 to bottom surface 19, of about 1 μm to about 50 μm, more preferably about 5 μm to about 50 μm.

Pores 21 may be formed in porous support 13 by any number of techniques, such as, but not limited to, micro-molding, laser micromachining, plasma etching, chemical etching, as well as the techniques disclosed in the following patents, all of which are incorporated herein by reference in their entireties: U.S. Pat. No. 9,728,802 B2, inventors Mittelsteadt et al., issued Aug. 8, 2017; U.S. Pat. No. 8,962,132 B2, inventors Liu et al, issued Feb. 24, 2015; U.S. Pat. No. 7,947,405 B2, inventors Mittelsteadt et al., issued May 24, 2011; U.S. Pat. No. 7,867,669 B2, inventors Liu et al., issued Jan. 11, 2011; and U.S. Pat. No. 7,807,063 B2, inventors Liu et al., issued Oct. 5, 2010. These techniques may be used in combination, with some pores 21 being made by one technique and other pores 21 being made by or more other techniques.

Solid electrolyte with alkali ion conductivity 15 is disposed within one or more of pores 21, preferably within all of pores 21. Preferably, solid electrolyte 15 extends the entire length of its respective pore 21 between top surface 17 and bottom surface 19 to form an electrolytic pathway across the entire thickness of porous support 13, with solid electrolyte 15 more preferably completely filling its respective pore 21. As will be discussed further below, in some embodiments, solid electrolyte 15 may have a comparatively lower melting temperature, at least as compared to porous support 13, so that porous support 13 may remain solid at temperatures or under other conditions at which solid electrolyte 15 may be caused to liquefy. In this manner, for example, the solid electrolyte 15 may be liquefied and then may be introduced into one or more of pores 21 of porous support 13. Thereafter, the thus-liquefied solid electrolyte may be cooled within such pores 21 to re-form a monolithic solid electrolyte 15 therewithin. In other embodiments, solid electrolyte 15 may have a comparatively higher melting temperature, at least as compared to porous support 13. In this manner, for example, upon heating, porous support 13 may soften and pores 21 may expand, thereby allowing particles of solid electrolyte 15 that are larger than the initially-sized pores 21 to penetrate the thus-expanded pores 21. Such particles of solid electrolyte 15 present within pores 21 also may be sintered together. Thereafter, upon cooling of porous support 13, pores 21 may contract around the sintered solid electrolyte 15 disposed therewithin. Moreover, even if porous support 13 does not expand, where particles of solid electrolyte 15 are used that are smaller than the pore size of pores 21, such particles may penetrate pores 21 and be sintered therewithin.

Examples of materials that may be suitable for use as solid electrolyte 15 in one or more embodiments of the present invention include alkali ion conductors, such as, but not limited to, the following: $Li^+$ conductors, such as, but not limited to, lithium anti-perovskite electrolytes, LiSICON-type electrolytes, lithium sulfide electrolytes, and Garnet-type lithium electrolytes; and $Na^+$ conductors, such as, but not limited to, sodium anti-perovskite electrolytes, NaSI-CON-type electrolytes, and sodium sulfide electrolytes.

The aforementioned lithium anti-perovskite electrolytes may include, but are not limited to, $Li_3OCl$ and $Li_{3-x}M_{x/2}OA$, wherein $0<x\leq3$, wherein M is an alkaline earth metal cation dopant, such as, but not limited to, $Mg^{2+}$, $Ca^{2+}$, $Sr^{2+}$, $Ba^{2+}$, and mixtures thereof, and wherein A is a halogen dopant, such as, but not limited to, $F^-$, $Cl^-$, $Br^-$, $I^-$, and mixtures thereof.

The aforementioned sodium anti-perovskite electrolytes may include, but are not limited to, $Na_3OCl$ and $Na_{3-x}M_{x/2}OA$, wherein $0<x<0.8$, wherein M is an alkaline earth metal cation dopant, such as, but not limited to, $Mg^{2+}$, $Ca^{2+}$, $Sr^{2+}$, $Ba^{2+}$, and mixtures thereof, and wherein A is a halogen dopant, such as, but not limited to, $F^-$, $Cl^-$, $Br^-$, $I^-$, and mixtures thereof.

The aforementioned LiSICON-type electrolytes may include, but are not limited to, $Li_{2+2x}Zn_{1-x}GeO_4$, wherein $-0.36\leq x\leq0.87$.

The aforementioned NaSICON-type electrolytes may include, but are not limited to $Na_{2+2x}Zr_2Si_xP_{3-x}O_{12}$, wherein $0 \leq x \leq 3$.

The aforementioned lithium sulfide electrolytes may include, but are not limited to, $Li_xSi_yS_z$, wherein $0.33 \leq x \leq 0.5$, $0.1 \leq y \leq 0.2$, and $0.4 \leq z \leq 0.55$, such as, but not limited to, $Li_2S$—$SiS_2$, $Li$—$SiS_2$, and $Li$—$S$—$Si$; $Li_xSn_yS_z$, wherein $0.25 \leq x \leq 0.65$, $0.05 \leq y \leq 0.2$, and $0.25 \leq z \leq 0.65$, such as, but not limited to, $Li_2S$—$SnS_2$, $Li$—$SnS_2$, and $Li$—$S$—$Sn$; $Li_xP_yS_z$, wherein $0.33 \leq x \leq 0.67$, $0.07 \leq y \leq 0.2$, and $0.4 \leq z \leq 0.55$, such as, but not limited to, $Li_2S$—$P_2S_5$; $Li_xP_yS_zO_w$, wherein $0.33 \leq x \leq 0.67$, $0.07 \leq y \leq 0.2$, $0.4 \leq z \leq 0.55$, and $0 \leq w \leq 0.15$; $Li_xDP_yS_z$, wherein D is a dopant, such as, but not limited to, Si, Ge, Sn, As, Al, and mixtures thereof, and wherein $2 \leq x \leq 8$, $0.5 \leq y \leq 2.5$, and $4 \leq z \leq 12$; $Li_xDP_yS_zO_b$, wherein D is a dopant, such as, but not limited to, Si, Ge, Sn, As, Al, and mixtures thereof, and wherein $2 \leq x \leq 8$, $0.5 \leq y \leq 2.5$, $4 \leq z \leq 12$, and $b < 3$.

The aforementioned sodium sulfide electrolytes may include, but are not limited to, $Na_xPS_{4-x}H_x$, wherein $0 \leq x \leq 0.2$ and wherein H is a halogen dopant, such as, but not limited to, $F^-$, $Br^-$, $I^-$ and mixtures thereof.

The aforementioned Garnet-type electrolytes may include, but are not limited to, compositions of the formula $Li_xDLa_yM_2O_{12}$, wherein $3 \leq x \leq 7$ and $y=2$ or $3$, wherein M represents a metal, such as, but not limited to, Bi, Hf, Nb, Sb, Sn, Ta, W, Y, Zr, and mixtures thereof, and wherein D is a dopant, such as, but not limited to, Al, Ca, Ba, Mg, Sr, and mixtures thereof.

Additional materials that may be suitable for use as solid electrolyte 15 in one or more embodiments of the present invention may be disclosed in one or more of the following documents, all of which are incorporated herein by reference in the respective entireties: U.S. Pat. No. 9,246,188 B2, inventors Zhao et al., issued Jan. 26, 2016; U.S. Patent Application Publication No. US 2017/0275172 A1, inventors Zhao et al., published Sep. 28, 2017; U.S. Patent Application Publication No. US 2017/0025705 A1, inventors Miara et al., published Jan. 26, 2017; and U.S. Patent Application Publication No. US 2016/0368777 A1, inventors Goodenough et al., published Dec. 22, 2016.

As noted above, solid electrolyte membranes of the type conventionally used in lithium batteries tend to be brittle and lacking the flexibility desired for such applications. (See also Kerman et al., "Review-Practical Challenges Hindering the Development of Solid State Li Ion Batteries," *Journal of The Electrochemical Society*, 164(7): A1731-1744 (2017), which is incorporated herein by reference in its entirety.) By contrast, due, in part, to the flexibility of porous support 13, composite membrane 11 has good flexibility. Moreover, composite membrane 11 enables a thinner structure to be made than would be the case with an electrolyte-only membrane. In some cases, composite membrane 11 may have a thickness of up to about 200 µm. Composite membrane 11 provides improvements in safety, handling, and ease of fabrication without reducing the ionic conductivity as compared to films made from unsupported electrolyte. By utilizing pores in the porous support, tortuosity is eliminated and conductivity of the bulk material is retained.

Figure 6:
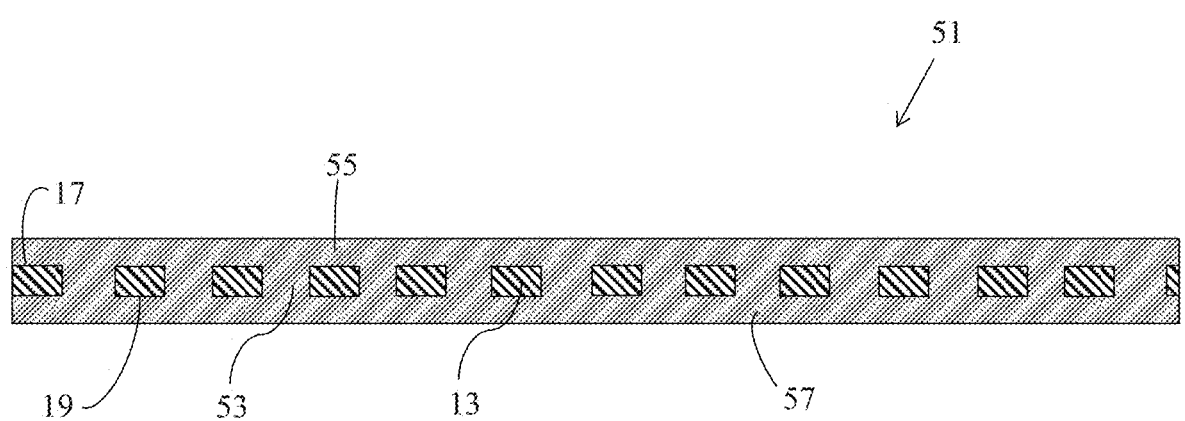
FIG. 6 is a section view of a second embodiment of a composite membrane comprising a solid electrolyte with alkali ion conductivity, the composite membrane being constructed according to the present invention.

Referring now to FIG. 6, there is shown a section view of a second embodiment of a composite membrane comprising a solid electrolyte with alkali ion conductivity, the composite membrane being constructed according to the present invention and being represented generally by reference numeral 51.

Composite membrane 51 is similar in many respects to composite membrane 11. For example, both composite membrane 51 and composite membrane 11 include a porous support 13. The principal difference between composite membrane 51 and composite membrane 11 is that, in composite membrane 11, solid electrolyte 15 is typically only present within pores 21 of porous support 13 whereas, in composite membrane 51, a solid electrolyte 53, which may be identical in composition to solid electrolyte 15, not only fills pores 21 of porous support 13 but also typically covers at least a portion, if not all, of top surface 17 and bottom surface 19 of porous support 13. In other words, solid electrolyte 53 forms a top layer 55 over top surface 17 of support 13 and a bottom layer 57 under bottom surface 19 of porous support 13.

As can be appreciated, due to the presence of top layer 55 and bottom layer 57 in composite membrane 51, composite membrane 51 has a comparatively greater thickness than does composite membrane 11. Although such an increase in thickness is generally not desirable (since, ideally, one wants the composite membrane to be as thin as possible), as will become apparent from the discussion below, some of the techniques described herein for making the composite membrane of the present invention may result in the formation of top layer 55 and bottom layer 57. In any event, provided that the increase in thickness attributable to top layer 55 and bottom layer 57 is kept as small as possible, any adverse effects relating to the increased thickness may be minimized.

Figure 7:
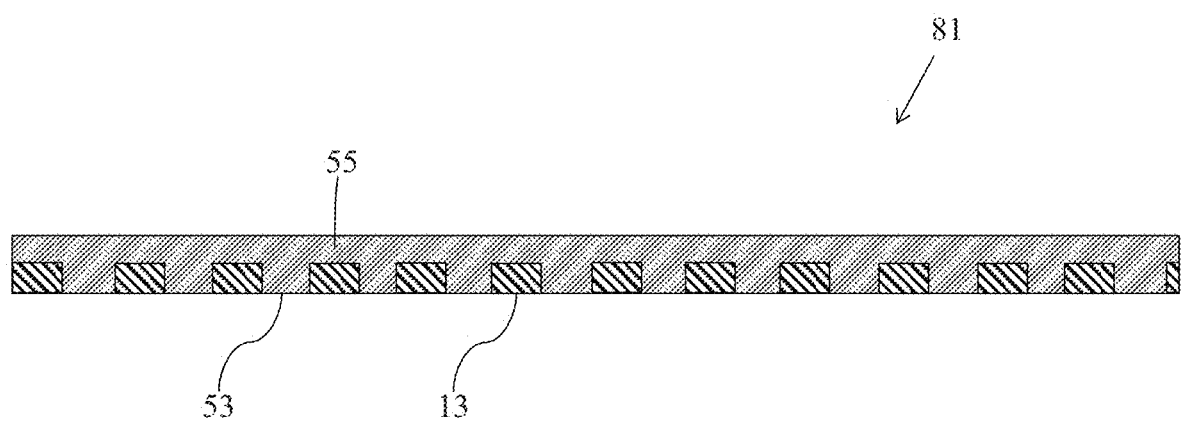
FIG. 7 is a section view of a third embodiment of a composite membrane comprising a solid electrolyte with alkali ion conductivity, the composite membrane being constructed according to the present invention.

Referring now to FIG. 7, there is shown a section view of a third embodiment of a composite membrane comprising a solid electrolyte with alkali ion conductivity, the composite membrane being constructed according to the present invention and being represented generally by reference numeral 81.

Composite membrane 81 is similar in many respects to composite membrane 51, the principal difference between the two composite membranes being that composite membrane 81 may lack structure corresponding to bottom layer 57 of composite membrane 51. As can be appreciated, because composite membrane 81 lacks a bottom layer 57, composite membrane 81 may be thinner than composite membrane 51.

Figure 8:
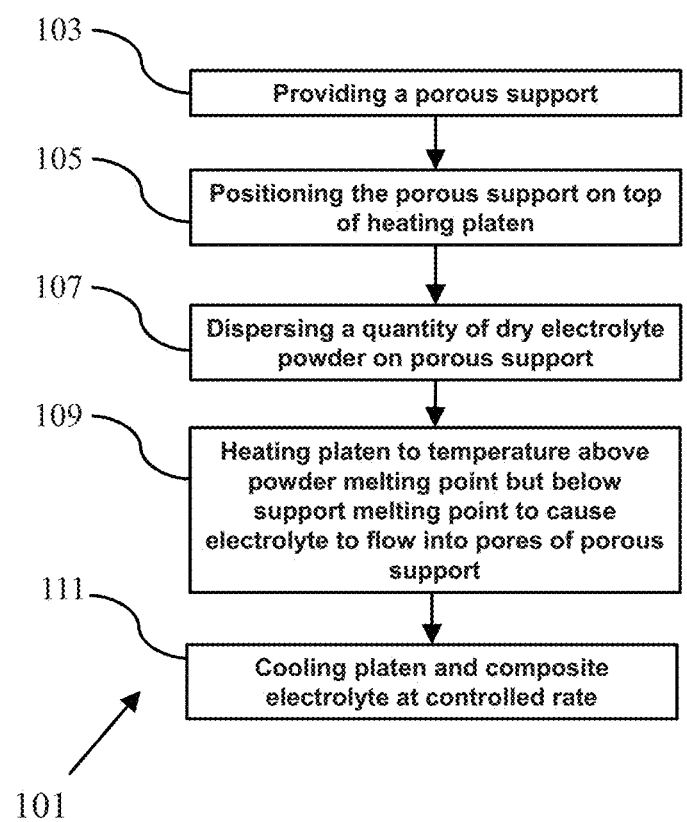
FIG. 8 is a flowchart schematically depicting a first method according to the present invention for fabricating a composite membrane comprising a porous support and a solid electrolyte.

Referring now to FIG. 8, there is shown a flowchart schematically depicting a first method, according to the present invention, for fabricating a composite membrane comprising a porous support and a solid electrolyte, the first method being represented generally by reference numeral 101.

Method 101 may comprise a first step 103 of providing a porous support. The porous support may be identical to porous support 13 and is preferably made of a solid polymeric material that is dimensionally stable, flexible, and non-conductive to ions. The porous support may be made of a material that has a relatively high melting temperature. For example, the porous support may be made of a polymer that has a melting temperature of at least 250° C., preferably at least 350° C., such as, but not limited to, Kapton® polyimide (DuPont, Wilmington, Del.), polysulfone (PSU), polyphenylene sulfide (PPS), polytetrafluoroethylene, polyether ether ketone (PEEK), and polyamide-imide (PAI).

Method 101 may further comprise a second step 105 of positioning the porous support on top of a heating platen. At this stage in the method, the heating platen is preferably not yet turned on.

Method 101 may further comprise a third step 107 of dispersing a quantity of dry electrolyte powder on top of the porous support positioned on the heating platen. The heating platen may be covered with a layer of TEFLON® polytetrafluoroethylene. The dry electrolyte powder dispersed on top of the porous support may consist of any one or more of the solid electrolytes discussed above, provided that the one or more solid electrolytes have a lower melting temperature than that of the porous support. For example, where the porous support has a melting temperature of at least 350° C., the one or more electrolytes may have a melting temperature of less than 350° C. Examples of electrolytes having a comparatively low melting temperature include lithium anti-perovskite electrolytes and sodium anti-perovskite electrolytes including, but not limited to, $Li_3OCl$; $Li_{3-x}M_{x/2}OA$, wherein 0<x≤3, wherein M is an alkaline earth metal cation dopant, such as, but not limited to, $Mg^{2+}$, $Ca^{2+}$, $Sr^{2+}$, $Ba^{2+}$, and mixtures thereof, and wherein A is a halogen dopant, such as, but not limited to, $F^-$, $Cl^-$, $Br^-$, $I^-$, and mixtures thereof; $Na_3OCl$; and $Na_{3-x}M_{x/2}OA$, wherein 0<x<0.8, wherein M is an alkaline earth metal cation dopant, such as, but not limited to, $Mg^{2+}$, $Ca^{2+}$, $Sr^{2+}$, $Ba^{2+}$, and mixtures thereof, and wherein A is a halogen dopant, such as, but not limited to, $F^-$, $Cl^-$, $Br^-$, $I^-$, and mixtures thereof.

The quantity of dry electrolyte powder dispersed on top of the porous support is preferably sufficient to completely fill the pores of the porous support in the manner that will hereinafter be described. Preferably, the volume of dry electrolyte powder is about 1×-10× the void volume of the pores of the porous support.

Method 101 may further comprise a fourth step 109 of heating the platen to a temperature that is above the melting point of the electrolyte powder but below the melting point of the porous support. Such heating causes the electrolyte, which is positioned on the porous support on top of the platen, to liquefy without causing the porous support to melt. As a result, the molten electrolyte flows into and fills the pores of the porous support. If desired, a vacuum could be used to facilitate the drawing of the molten electrolyte into the pores.

Method 101 may further comprise a fifth step 111 of cooling the platen and the heated contents positioned thereon at a controlled rate, whereby the electrolyte solidifies into a monolithic structure in which individual powder particles can no longer be distinguished. Such cooling may comprise passive cooling or active cooling. The resulting composite membrane may have a structure similar to that of composite membrane 81 if the molten electrolyte is confined to the top surface of the porous support and the pores of the support or may have a structure similar to that of composite membrane 51 if the molten electrolyte additionally flows to the underside of the porous support.

Steps 105, 107, 109 and 111 of method 101 are preferably performed in a low-moisture atmosphere (e.g., dry room, argon-purged glove box, etc.)

Figure 9:
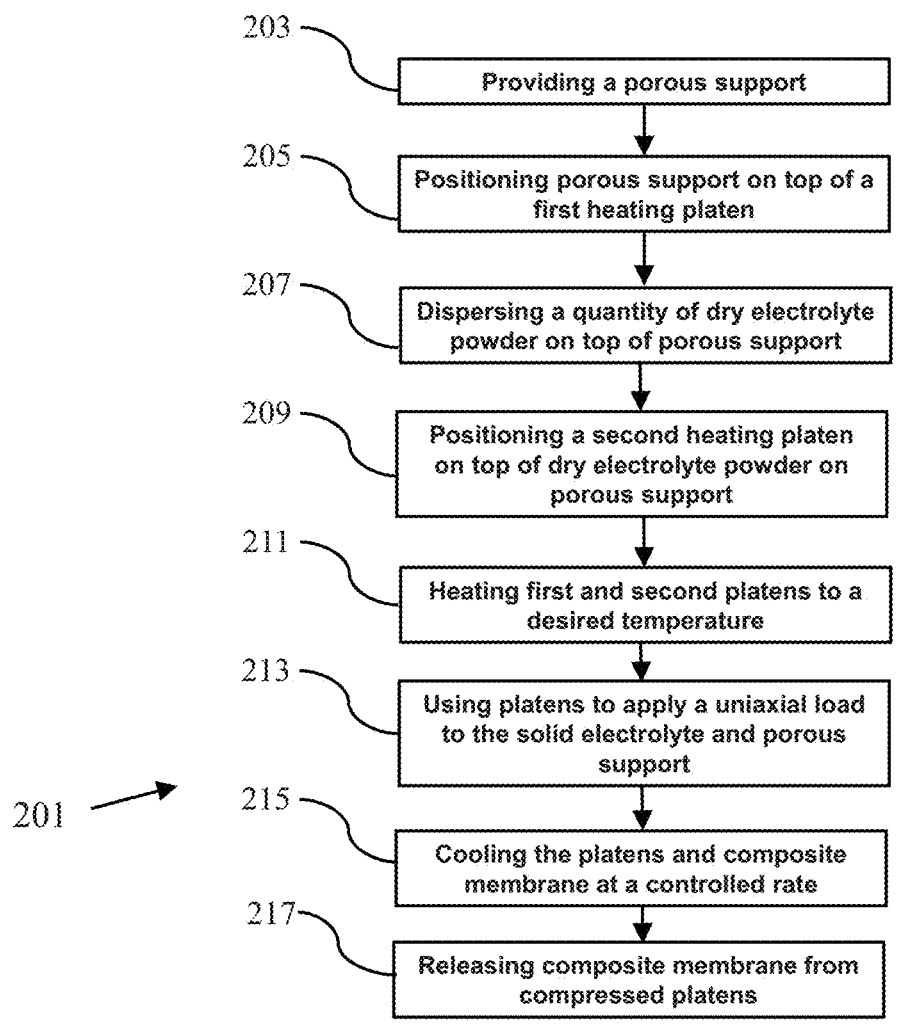
FIG. 9 is a flowchart schematically depicting a second method according to the present invention for fabricating a composite membrane comprising a porous support and a solid electrolyte.

Referring now to FIG. 9, there is shown a flowchart schematically depicting a second method, according to the present invention, for fabricating a composite membrane comprising a porous support and a solid electrolyte, the second method being represented generally by reference numeral 201.

Method 201 may comprise a first step 203 of providing a porous support. The porous support may be identical to the porous support of method 101.

Method 201 may further comprise a second step 205 of positioning the porous support on top of a first heating platen. The first heating platen may be covered with a layer of TEFLON® polytetrafluoroethylene. At this stage in the method, the first heating platen is preferably not yet turned on.

Method 201 may further comprise a third step 207 of dispersing a quantity of dry electrolyte powder on top of the porous support positioned on the platen. The dry electrolyte powder dispersed on top of the porous support may consist of any one or more of the solid electrolytes discussed above. The one or more solid electrolytes need not have a lower melting temperature than that of the porous support. Rather, as discussed further below, if the one or more solid electrolytes used have a lower melting temperature than the porous support, then the solid electrolyte will liquefy and flow into the porous support when the powder and porous support are subjected to conditions of elevated heat and elevated pressure. Upon cooling, the electrolyte will form a monolithic solid structure. On the other hand, if the one or more solid electrolytes used have a higher melting temperature than the porous support, then, when the powder and porous support are subjected to conditions of elevated heat and elevated pressure, if the particle size of the powder is larger than the pore size, the pores of the porous support may expand sufficiently to allow the electrolyte to penetrate the pores, and the electrolyte particles may be sintered together within the pores. Alternatively, if the particle size of the electrolyte powder is smaller than the pore size, then the pores need not expand to enable the electrolyte powder to penetrate the pores and to be sintered therewithin. Where the electrolyte particles are sintered within the pores, as opposed to penetrating the pores in a liquid form and then solidifying, a monolithic structure is not formed.

Accordingly, examples of electrolytes that may be used in third step 207 include $Li^+$ conductors, such as, but not limited to, lithium anti-perovskite electrolytes, LiSICON-type electrolytes, lithium sulfide electrolytes, and Garnet-type lithium electrolytes; and $Na^+$ conductors, such as, but not limited to, sodium anti-perovskite electrolytes, NaSICON-type electrolytes, and sodium sulfide electrolytes.

Preferably, the volume of dry electrolyte powder is about 1×-10× the void volume of the pores of the porous support.

Method 201 may further comprise a fourth step 209 of positioning a second heating platen on top of the dry electrolyte powder on the porous support. The second heating platen may be provided with a layer of TEFLON® polytetrafluoroethylene to contact the dry electrolyte powder. At this stage in the method, the second heating platen is preferably not yet turned on.

Method 201 may further comprise a fifth step 211 of heating the first and second platens to a desired temperature. Where the solid electrolyte has a melting temperature that is lower than the melting temperature of the porous support, the first and second platens may be heated to a temperature sufficient to cause the solid electrolyte to liquefy. Where the solid electrolyte has a melting temperature that is higher than the melting temperature of the porous support and where the particle size of the electrolyte is greater than the pore size, the first and second platens may be heated to a temperature sufficient to cause the pores of the porous support to expand sufficiently for the solid electrolyte to enter thereinto and for the solid electrolyte to be sintered. Alternatively, where the solid electrolyte has a melting temperature that is higher than the melting temperature of the porous support and where the particle size of the electrolyte is less than the pore size, the first and second platens may be heated to a temperature sufficient to cause the solid electrolyte that has penetrated the pores to be sintered therewithin.

Method 201 may further comprise a sixth step 213 of using the platens to apply a uniaxial load to the solid electrolyte and porous support. Due to the application of heat and pressure, the electrolyte is drawn into the pores of the porous support. A vacuum may be applied to promote the movement of the electrolyte into the pores of the porous support.

Although steps 211 and 213 are discussed herein sequentially, they may be performed concurrently. For example, the platens may be heated to an elevated temperature of, for example, about 25° C.-350° C. and may be used to apply a pressure of, for example, about 500-100,000 psi for an extended period of time, for example, about 5-1080 minutes, preferably 60-120 minutes.

Method 201 may further comprise a seventh step 215 of cooling the platens and the composite membrane at a controlled rate. Such cooling may comprise passive cooling or active cooling.

Method 201 may further comprise an eighth step 217 of releasing the composite membrane from the compressed platens. The resulting composite membrane may have a structure similar to that of composite membrane 81 if the electrolyte liquefies and is confined to the top surface of the porous support and the pores of the support or may have a structure similar to that of composite membrane 51 if the molten electrolyte additionally flows to the underside of the porous support.

Steps 205, 207, 209, 211, 213, 215 and 217 of method 201 are preferably performed in a low-moisture atmosphere (e.g., dry room, argon-purged glove box, etc.)

Figure 10:
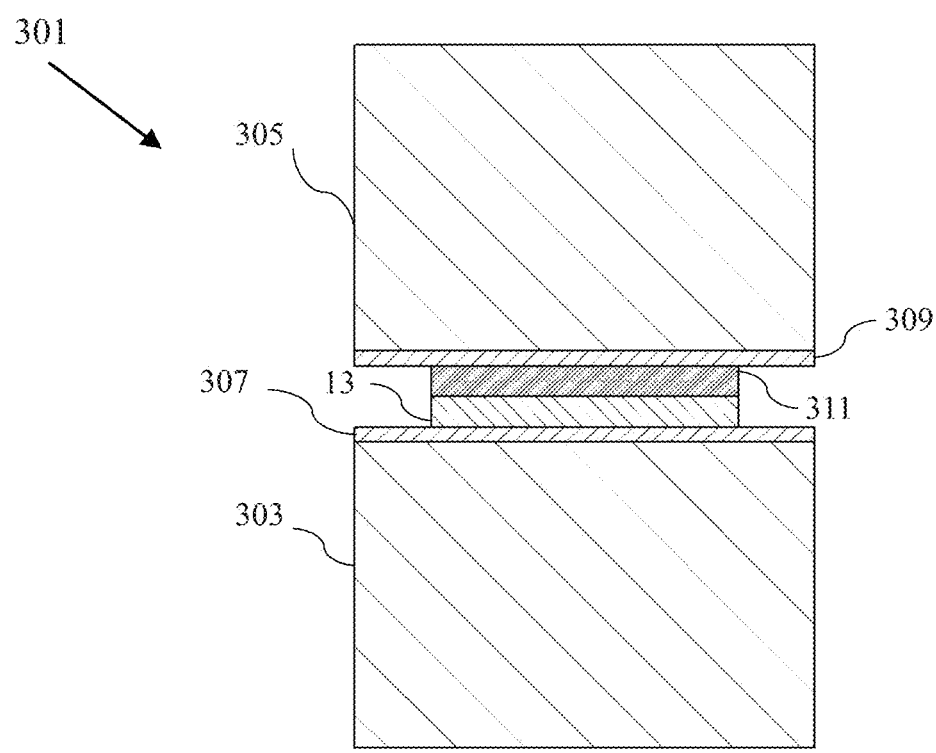
FIG. 10 is a simplified schematic section view of an apparatus suitable for use in practicing the method of FIG. 9.

Referring now to FIG. 10, there is schematically shown a section view of an apparatus suitable for use in practicing method 201, the apparatus being represented generally by reference numeral 301.

Apparatus 301 comprises a pair of heating platens 303 and 305. In the present embodiment, heating platen 303 may be fixed, and heating platen 305 may be movable towards heating platen 303 to apply a force thereto. Alternatively, heating platen 303 may be movable and heating platen 305 may be fixed, or both heating platen 303 and heating platen 305 may be movable. The top surface of heating platen 303 is provided with a layer 307 of TEFLON® polytetrafluoroethylene, and the bottom surface of heating platen 305 is provided with a layer 309 of TEFLON® polytetrafluoroethylene. As can be seen, porous support 13 may be positioned on layer 307, and a layer 311 of electrolyte powder may be positioned on top of porous support 13 and below layer 309.

Figure 11:
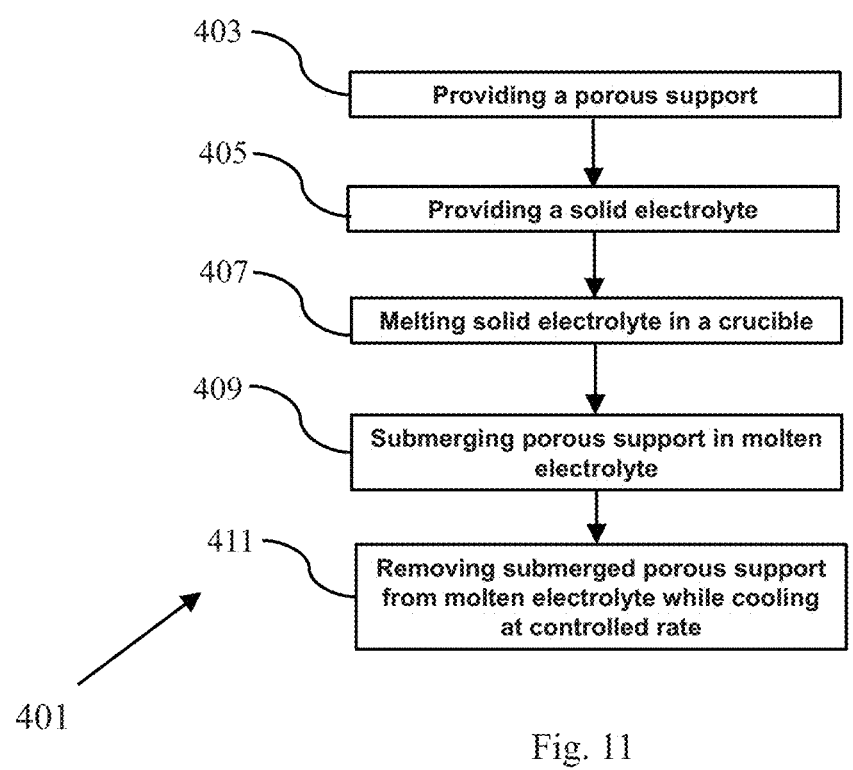
FIG. 11 is a flowchart schematically depicting a third method according to the present invention for fabricating a composite membrane comprising a porous support and a solid electrolyte.

Referring now to FIG. 11, there is shown a flowchart schematically depicting a third method, according to the present invention, for fabricating a composite membrane comprising a porous support and a solid electrolyte, the third method being represented generally by reference numeral 401.

Method 401 may comprise a first step 403 of providing a porous support. The porous support may be identical to porous support 13 and is preferably made of a solid polymeric material that is dimensionally stable, flexible, and non-conductive to ions. The porous support may be made of a material that has a relatively high melting temperature. For example, the porous support may be made of a polymer that has a melting temperature of at least 250° C., preferably at least 350° C., such as, but not limited to, Kapton® polyimide (DuPont, Wilmington, Del.), polysulfone (PSU), polyphenylene sulfide (PPS), polytetrafluoroethylene, polyether ether ketone (PEEK), and polyamide-imide (PAI).

Method 401 may further comprise a second step 405 of providing a solid electrolyte. The solid electrolyte may consist of any one or more of the solid electrolytes discussed above, provided that the one or more solid electrolytes have a lower melting temperature than that of the porous support. For example, where the porous support has a melting temperature of at least 350° C., the one or more electrolytes may have a melting temperature of less than 350° C. Examples of electrolytes having a comparatively low melting temperature include lithium anti-perovskite electrolytes and sodium anti-perovskite electrolytes including, but not limited to, $Li_3OCl$; $Li_{3-x}M_{x/2}OA$, wherein $0<x\leq3$, wherein M is an alkaline earth metal cation dopant, such as, but not limited to, $Mg^{2+}$, $Ca^{2+}$, $Sr^{2+}$, $Ba^{2+}$, and mixtures thereof, and wherein A is a halogen dopant, such as, but not limited to, $F^-$, $Cl^-$, $Br^-$, $I^-$, and mixtures thereof $Na_3OCl$; and $Na_{3-x}M_{x/2}OA$, wherein $0<x<0.8$, wherein M is an alkaline earth metal cation dopant, such as, but not limited to, $Mg^{2+}$, $Ca^{2+}$, $Sr^{2+}$, $Ba^{2+}$, and mixtures thereof, and wherein A is a halogen dopant, such as, but not limited to, $F^-$, $Cl^-$, $Br^-$, $I^-$, and mixtures thereof.

Method 401 may further comprise a third step 407 of melting the solid electrolyte in a crucible or similar receptacle to form a volume of molten electrolyte. Preferably, the volume of molten electrolyte is sufficient to enable the porous support to be completely submerged therein.

Method 401 may further comprise a fourth step 409 of completely submerging the porous support in the volume of molten electrolyte, whereby the pores of porous support become completely filled with the molten electrolyte (and the top and/or bottom surfaces of the porous support may also become coated with the molten electrolyte).

Method 401 may further comprise a fifth step 411 of removing the previously submerged porous support from the molten electrolyte while cooling the thus-treated porous support at a controlled rate. Such cooling may comprise passive cooling or active cooling. Upon cooling, the electrolyte re-solidifies into a monolithic structure. The resulting composite membrane may have a structure similar to that of composite membrane 51 if the molten electrolyte coats both the top and bottom surfaces of the porous support.

Figure 12:
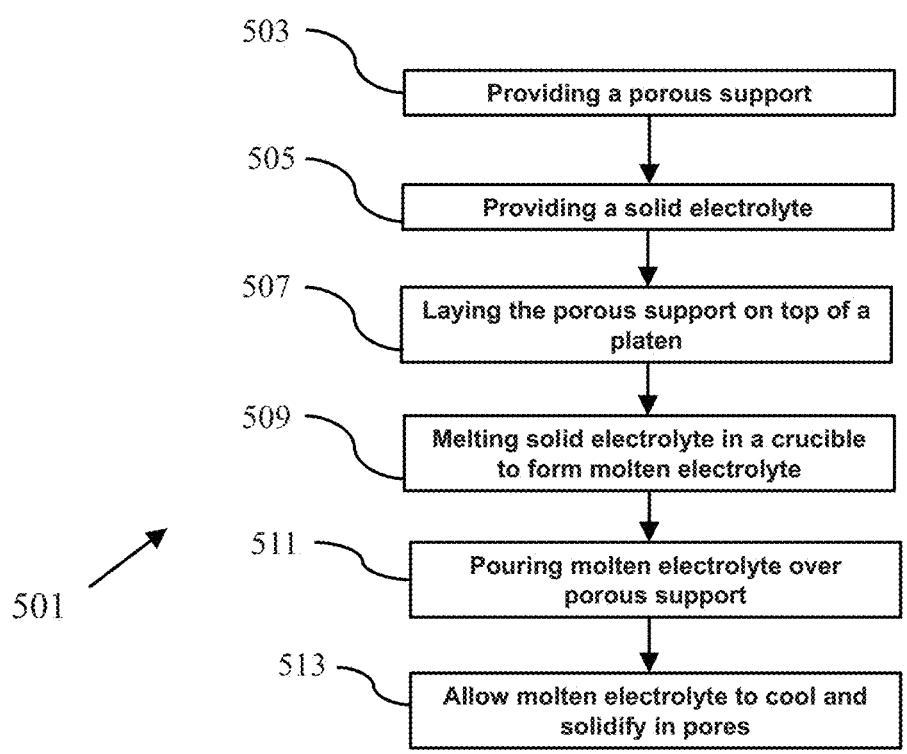
FIG. 12 is a flowchart schematically depicting a fourth method according to the present invention for fabricating a composite membrane comprising a porous support and a solid electrolyte.

Referring now to FIG. 12, there is shown a flowchart schematically depicting a fourth method, according to the present invention, for fabricating a composite membrane comprising a porous support and a solid electrolyte, the fourth method being represented generally by reference numeral 501.

Method 501 may comprise a first step 503 of providing a porous support. The porous support may be identical to porous support 13 and is preferably made of a solid polymeric material that is dimensionally stable, flexible, and non-conductive to ions. The porous support may be made of a material that has a relatively high melting temperature. For example, the porous support may be made of a polymer that has a melting temperature of at least 250° C., preferably at least 350° C., such as, but not limited to, Kapton® polyimide (DuPont, Wilmington, Del.), polysulfone (PSU), polyphenylene sulfide (PPS), polytetrafluoroethylene, polyether ether ketone (PEEK), and polyamide-imide (PAI).

Method 501 may further comprise a second step 505 of providing a solid electrolyte. The solid electrolyte may consist of any one or more of the solid electrolytes discussed above, provided that the one or more solid electrolytes have a lower melting temperature than that of the porous support. For example, where the porous support has a melting temperature of at least 350° C., the one or more electrolytes may have a melting temperature of less than 350° C. Examples of electrolytes having a comparatively low melting temperature include lithium anti-perovskite electrolytes and sodium anti-perovskite electrolytes including, but not limited to, $Li_3OCl$; $Li_{3-x}M_{x/2}OA$, wherein $0<x\leq3$, wherein M is an alkaline earth metal cation dopant, such as, but not limited to, $Mg^{2+}$, $Ca^{2+}$, $Sr^{2+}$, $Ba^{2+}$, and mixtures thereof, and wherein A is a halogen dopant, such as, but not limited to, F⁻, Cl⁻, Br⁻, I⁻, and mixtures thereof Na$_3$OCl; and Na$_{3-x}$M$_{x/2}$OA, wherein 0<x<0.8, wherein M is an alkaline earth metal cation dopant, such as, but not limited to, Mg$^{2+}$, Ca$^{2+}$, Sr$^{2+}$, Ba$^{2+}$, and mixtures thereof, and wherein A is a halogen dopant, such as, but not limited to, F⁻, Cl⁻, Br⁻, I⁻, and mixtures thereof.

Method 501 may further comprise a third step 507 of laying the porous support on top of a platen or other suitable support structure.

Method 501 may further comprise a fourth step 509 of melting the solid electrolyte in a crucible or similar receptacle to form a volume of molten electrolyte. Preferably, the volume of molten electrolyte is sufficient to completely fill the pores of the porous support.

Method 501 may further comprise a fifth step 511 of pouring the molten electrolyte over the porous support, whereby at least some of the pores, and preferably all of the pores, of the porous support become completely filled with the molten electrolyte.

Method 501 may further comprise a sixth step 513 of allowing the molten electrolyte to cool and to solidify within the pores of the porous support. Such cooling may comprise passive cooling or active cooling. Upon cooling, the electrolyte forms a monolithic solid structure. The resulting composite membrane may have a structure similar to that of composite membrane 81 if the electrolyte is confined to the top surface of the porous support and the pores of the support or may have a structure similar to that of composite membrane 51 if the molten electrolyte additionally flows to the underside of the porous support. Alternatively, if the molten electrolyte is confined to the pores of the porous support, the resulting composite membrane may have a structure similar to composite membrane 11. A vacuum may be applied to promote the movement of the electrolyte into the pores of the porous support.

Figure 13:
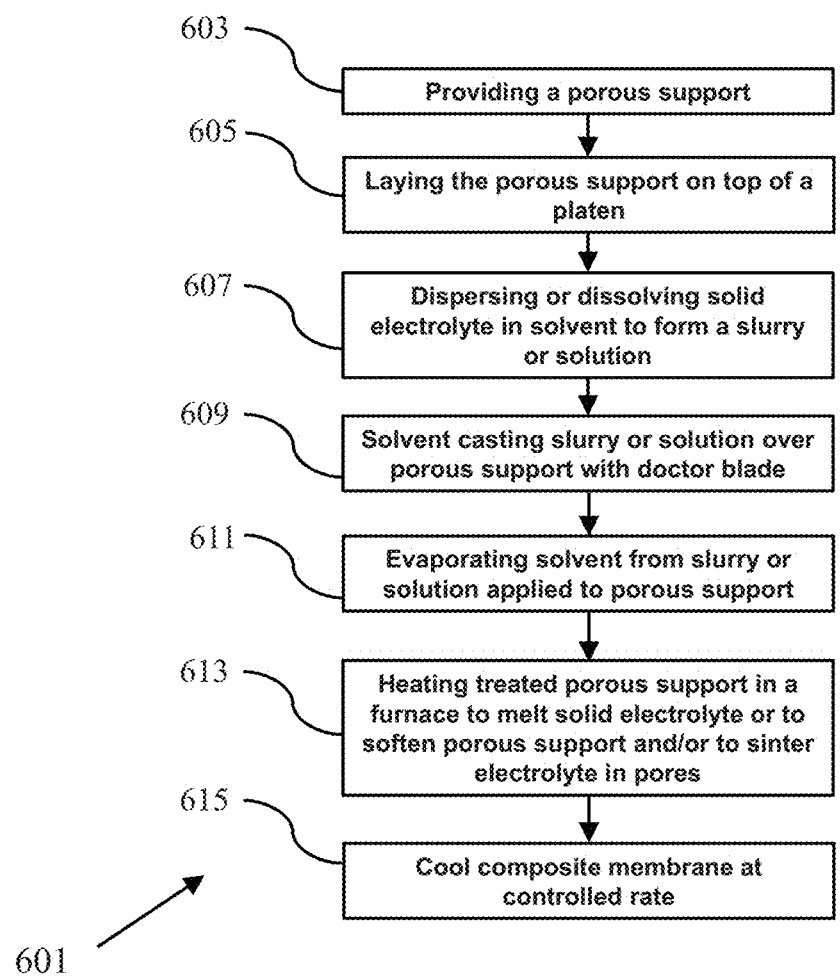
FIG. 13 is a flowchart schematically depicting a fifth method according to the present invention for fabricating a composite membrane comprising a porous support and a solid electrolyte.

Referring now to FIG. 13, there is shown a flowchart schematically depicting a fifth method, according to the present invention, for fabricating a composite membrane comprising a porous support and a solid electrolyte, the fifth method being represented generally by reference numeral 601.

Method 601 may comprise a first step 603 of providing a porous support. The porous support may be identical to the porous support of method 101.

Method 601 may further comprise a second step 605 of laying the porous support on top of a platen or other suitable support structure.

Method 601 may further comprise a third step 607 of dispersing or dissolving a quantity of a solid electrolyte in a suitable solvent to form a slurry or solution. The solid electrolyte may consist of any one or more of the solid electrolytes discussed above. Accordingly, examples of solid electrolytes that may be used in third step 607 include Li⁺ conductors, such as, but not limited to, lithium anti-perovskite electrolytes, LiSICON-type electrolytes, lithium sulfide electrolytes, and Garnet-type lithium electrolytes; and Na⁺ conductors, such as, but not limited to, sodium anti-perovskite electrolytes, NaSICON-type electrolytes, and sodium sulfide electrolytes.

Method 601 may further comprise a fourth step 609 of solvent casting the slurry or solution over the porous support using a doctor blade.

Method 601 may further comprise a fifth step 611 of evaporating the solvent from the slurry or solution applied to the porous support.

Method 601 may further comprise a sixth step 613 of heating the thus-treated porous support in a furnace at an appropriate temperature. Where the solid electrolyte has a melting temperature that is lower than the melting temperature of the porous support, the furnace temperature may be sufficient to cause the solid electrolyte to liquefy and to fill the pores, without causing damage to the porous support. Where the solid electrolyte has a melting temperature that is higher than the melting temperature of the porous support and where the particle size of the electrolyte is greater than the pore size, the furnace temperature may be sufficient to cause the pores of the porous support to expand sufficiently for the solid electrolyte to enter thereinto and for the solid electrolyte to be sintered. Alternatively, where the solid electrolyte has a melting temperature that is higher than the melting temperature of the porous support and where the particle size of the electrolyte is less than the pore size, the furnace temperature may be sufficient to cause the solid electrolyte that has penetrated the pores to be sintered therewithin.

Method 601 may further comprise a seventh step 615 of cooling the composite membrane at a controlled rate. Such cooling may comprise passive cooling or active cooling. Where the electrolyte particles are sintered within the pores, as opposed to penetrating the pores in a liquid form and then solidifying, a monolithic structure is not formed.

The resulting composite membrane may have a structure similar to that of composite membrane 81 if the electrolyte liquefies and is confined to the top surface of the porous support and the pores of the support or may have a structure similar to that of composite membrane 51 if the molten electrolyte additionally flows to the underside of the porous support.

According to some of the methods discussed above, it may be possible to use a mask to prevent the solid electrolyte from being deposited on the top surface and/or bottom surface of the porous support.

Figure 14:
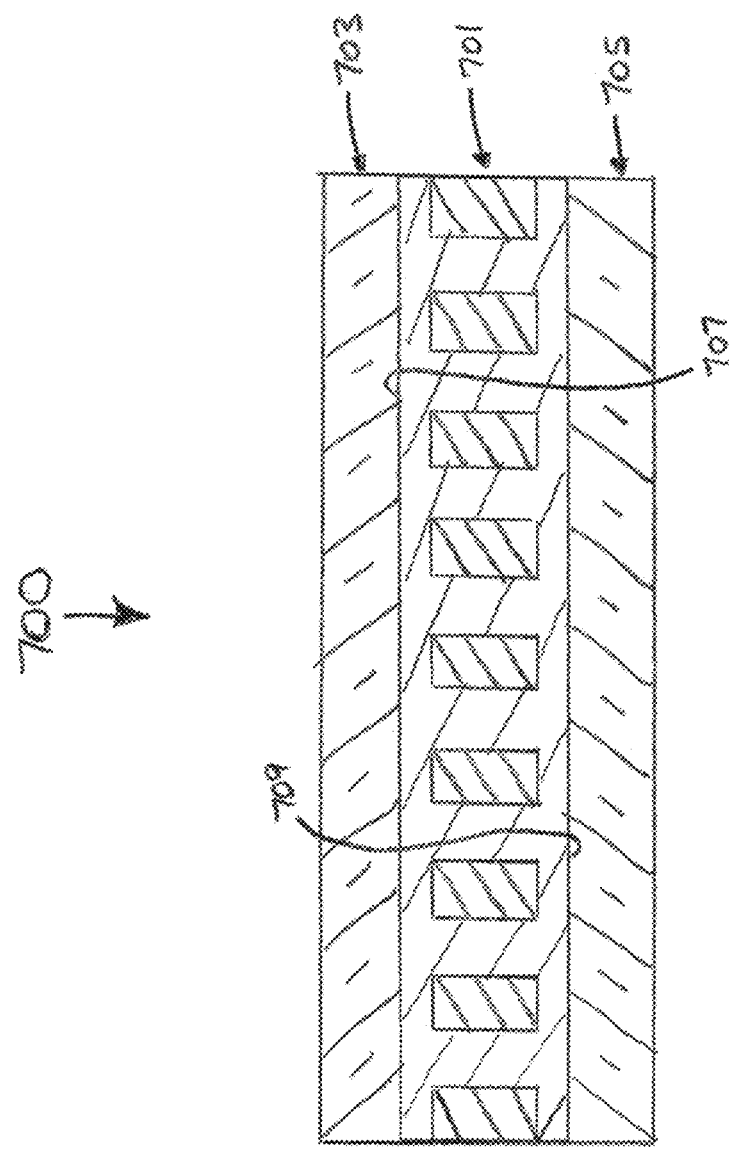
FIG. 14 is a simplified schematic section view of one embodiment of a battery comprising the composite membrane of FIG. 1.

As can be appreciated, the composite membrane may be incorporated into a variety of electrochemical cells, such as, but not limited to, an alkali ion battery (e.g., lithium ion battery, sodium ion battery). Referring now to FIG. 14, there is schematically shown a battery constructed according to the present invention, the battery being represented generally by reference numeral 700.

Battery 700, which is preferably devoid of any liquid electrolyte, may comprise a composite membrane 701, a cathode 703, and an anode 705. Composite membrane 701 may have the structure and composition of any of the composite membranes disclosed in the present application, such as, but not limited to, composite membranes 11, 51 and 81, and may be made by any of the methods disclosed in the present application.

Cathode 703, which is preferably in direct physical contact with a first face 707 of composite membrane 701, may be made of any one or more solid materials including, but not limited to, lithium cobalt oxide, lithium nickel manganese oxide, lithium manganese oxide, lithium nickel manganese cobalt oxide, lithium iron phosphate, lithium nickel cobalt aluminum oxide, and sulfur. Alternatively, cathode 703 may be a gaseous material, such as air or oxygen.

Anode 705, which is preferably in direct physical contact with a second face 709 of composite membrane 701, may be made of any one or more materials including, but not limited to, graphite, silicon, lithium metal, and lithium titanate.

The following examples are provided for illustrative purposes only and are in no way intended to limit the scope of the present invention:

EXAMPLE 1

A circular disk of 25 µm polysulfone with 10 µm pores and 50% porosity was cut to 7.0 mm diameter. 7.6 mg of $Li_{10}SnP_2S_{12}$ (LSPS) was placed inside a 7.0 mm metal die so that it formed a first substantially-uniform layer. A second layer comprising the aforementioned 7.0 mm polysulfone disk was placed on top of the first LSPS layer. A third layer comprising another 7.6 mg of LSPS was used to form a substantially-uniform layer on top of the second layer. The top plunger was placed into the die, which was then placed into a hydraulic press wherein a pressure of 2 tons was applied while heating to a set temperature of 80° C. for 3 hours. After 3 hours, the pressure was released from the die, and the die was allowed to cool to room temperature. The solid electrolyte composite membrane, in disk form, was then removed from the die. The resulting membrane was 190 µm thick and had a mass of 0.0174 g.

Figure 15:
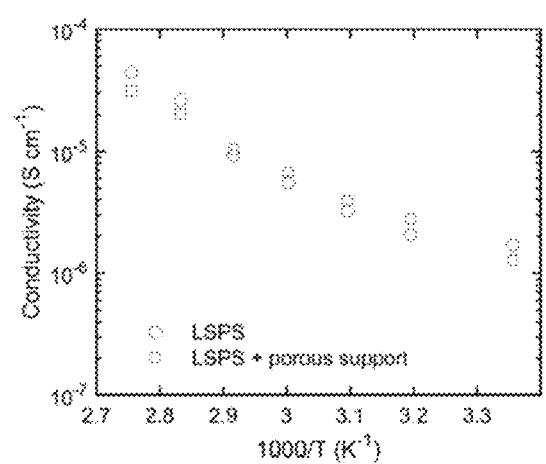
FIG. 15 is a graph comparing the conductivity, over a temperature range of 25° C. to 90° C., of $Li_{10}SnP_2S_{12}$ by itself and of $Li_{10}SnP_2S_{12}$ incorporated into a composite membrane of the present invention.
Figure 16:
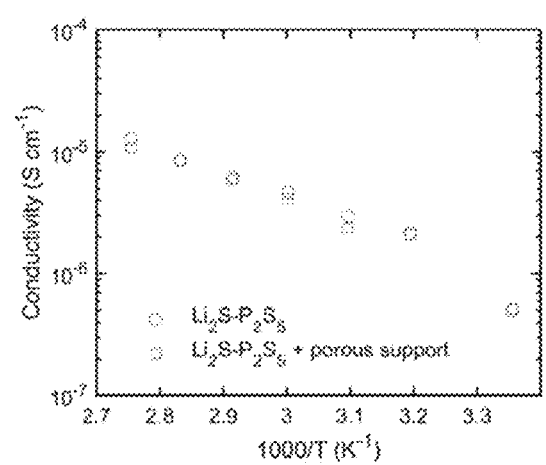
FIG. 16 is a graph comparing the conductivity, over a temperature range of 25° C. to 90° C., of $Li_2S—P_2S_2$ by itself and of $Li_2S—P_2S_2$ incorporated into a composite membrane of the present invention.

Conductivity of the fabricated membrane was tested by assembling the newly-formed solid electrolyte composite material into a 2032 coin cell between two flat stainless steel spacers. For comparison, LSPS was pressed into a solid disk while omitting the porous polysulfone disk. The resulting LSPS-only disk was 200 µm thick and had a mass of 0.0177 g. The LSPS disk was assembled into a 2032 coin cell in the same manner as the solid electrolyte composite disk. AC impedance scans were completed on both separators between the temperatures of 25° C. and 90° C. (see FIG. 15). Similar testing was performed for $Li_2S$—$P_2S_5$, both by itself and as part of a composite membrane of the present invention (see FIG. 16). As can be seen, the conductivities of the composite membrane were comparable to the solid electrolytes alone.

EXAMPLE 2

A circular disk of 75 µm thick Kapton® polyimide with 10 µm pores and 50% porosity was cut to 13.0 mm diameter. Approximately 4 g of $Li_3OCl$ powder was placed in an alumina crucible. The crucible, containing the $Li_3OCl$ powder, was heated to 350° C., which is significantly above the melting temperature of the $Li_3OCl$. This heating step was executed inside a box furnace, which was housed inside an argon-filled glove box ($O_2$<1.0 ppm, $H_2O$<0.5 ppm) held near room temperature. The $Li_3OCl$ was permitted to melt inside the alumina crucible. The box furnace was opened, and the porous Kapton® polyimide disk was submerged into the molten electrolyte. The composite was subsequently removed, and the molten electrolyte solidified passively under the inert atmosphere of the glove box. The resulting membrane was 250 µm thick.

For comparison, $Li_3OCl$ was pressed into a solid pellet, omitting the porous K polyimide disk. The resulting $Li_3OCl$-only pellet was 1300 µm thick.

Conductivities of the fabricated composite membrane and pellet were measured by assembling the membrane or pellet between two stainless steel blocking electrodes within a nylon collar. The conductivity test cell was placed inside a uniaxial press. A small load of approximately 0.2 tons was applied to the conductivity cell. AC impedance scans were completed on both samples between at 25° C. (see Table I). As is quantitatively illustrated, the conductivity of the composite membrane was comparable to the pellet of $Li_3OCl$-only.

TABLE I

| Sample | T (° C.) | Thk. (µm) | σ (mS cm$^{-1}$) |
| --- | --- | --- | --- |
| $Li_3OCl$ | 25 | 1300 | 0.20 |
| $Li_3OCl$ + Porous Support | 25 | 250 | 0.10 |

EXAMPLE 3

Figure 17:
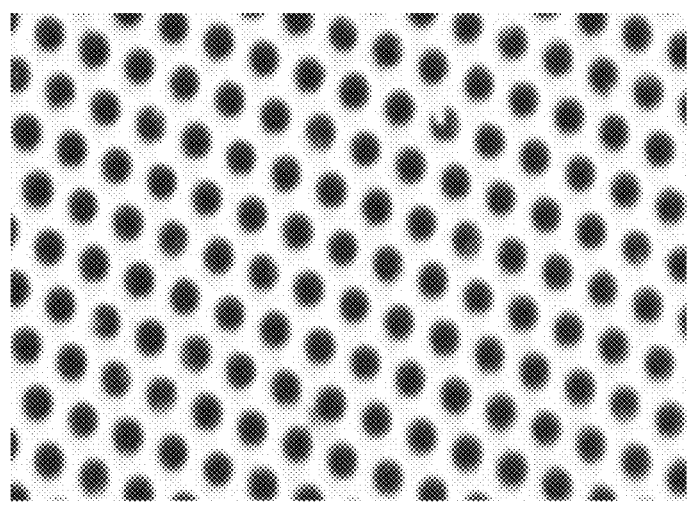
FIG. 17 is a magnified top-view image, obtained with an optical microscope, of the porous polyphenylene sulfide film discussed in Example 3.
Figure 18:
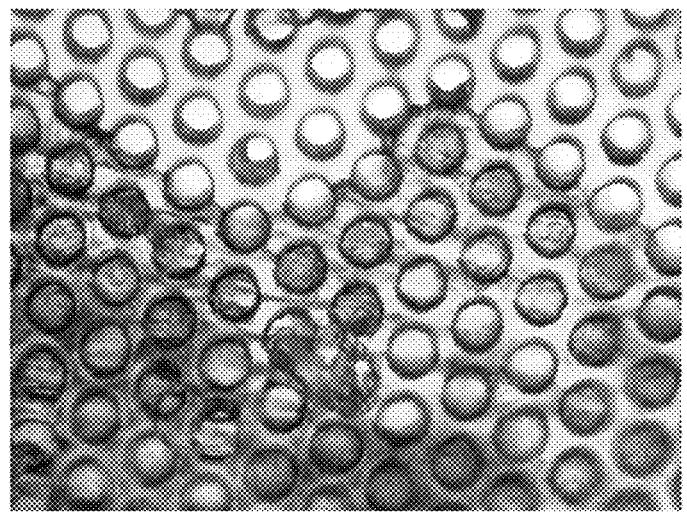
FIG. 18 is a magnified top-view image, obtained with an optical microscope, of $Li_3OI$ powder melted into the pores of the porous polyphenylene sulfide film discussed in Example 3.

A first layer of a TEFLON® polytetrafluoroethylene sheet was placed on top of a first flat glass slide. A second layer of $Li_3OI$ powder was placed on top of the first layer. A third layer of 25 µm thick polyphenylene sulfide (PPS) with 20 µm pore diameter was placed on the second layer. A fourth layer of $Li_3OI$ powder was placed on top of the third layer. A fifth layer of a TEFLON® polytetrafluoroethylene sheet was placed on top of the fourth layer. A second flat glass slide was placed on top of the fifth layer. The amount of $Li_3OI$ powder was in excess of the amount needed to fill the pore void volume, wherein half the total amount of $Li_3OI$ powder was used to form in the substantially-uniform second layer, and half the total amount was used to form the substantially-uniform fourth layer. Finally, the entire assembly was clamped together so as to ensure intimate contact between the third PPS layer and the second and fourth $Li_3OI$ powder layers. The assembly was heated to 250° C. for 4 hours wherein the powder melted into the pores of the PPS while the PPS remained a solid. Once cooled to ambient temperature, the solid electrolyte composite material was removed from between the two TEFLON® polytetrafluoroethylene layers. FIG. 17 shows an optical microscope image of a porous PPS film that is 25 µm thick, and FIG. 18 shows an optical microscope image wherein the PPS pores are filed with $Li_3OI$ powder using the method described above.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of preparing a composite membrane, the method comprising the steps of:
   (a) providing a porous support, the porous support being a unitary, dimensionally stable, flexible structure made of a polymer that is non-conductive to ions, the porous support being shaped to include a plurality of pores, the pores of the porous support being straight-through pores having a length;
   (b) providing a solid electrolyte, the solid electrolyte being an inorganic solid state material having alkali ion conductivity, wherein the porous support has a first melting temperature and the solid electrolyte has a second melting temperature and wherein the first melting temperature is higher than the second melting temperature; and
   (c) then, processing at least one of the porous support and the solid electrolyte using heat, and optionally pressure, such that the solid electrolyte is disposed within and spans the length of at least some of the pores of the porous structure, wherein said processing comprises introducing the solid electrolyte in a molten state into at least some of the pores of the porous support and then re-solidifying the molten electrolyte, wherein at least some of the pores of the porous support are completely filled by the solid electrolyte.

2. The method as claimed in claim 1 wherein the solid electrolyte is at least one member selected from the group consisting of lithium anti-perovskite electrolytes and sodium anti-perovskite electrolytes.

3. The method as claimed in claim 1 wherein the processing step comprises positioning the solid electrolyte on top of the porous support, positioning the porous support on a heating platen, and operating the heating platen at a third temperature that is above the second temperature but below the first temperature, whereby the solid electrolyte becomes a molten electrolyte that flows into and fills at least some of the pores of the porous structure, and then subjecting the molten electrolyte to cooling conditions whereby the molten electrolyte forms a monolithic solid.

4. The composite membrane prepared by the method of claim 3.

5. The method as claimed in claim 3 wherein the processing step further comprises applying pressure to the solid electrolyte during heating.

6. The composite membrane prepared by the method of claim 5.

7. The method as claimed in claim 1 wherein the processing step comprises melting the solid electrolyte in a crucible to form molten electrolyte, submerging the porous support in the molten electrolyte, and then subjecting the molten electrolyte to cooling conditions whereby the molten electrolyte forms a monolithic solid.

8. The composite membrane prepared by the method of claim 7.

9. The method as claimed in claim 1 wherein the processing step comprises melting the solid electrolyte in a crucible to form molten electrolyte, pouring the molten electrolyte over the porous substrate to fill at least some of the pores, and then subjecting the molten electrolyte to cooling conditions, whereby the molten electrolyte forms a monolithic solid.

10. The composite membrane prepared by the method of claim 9.

11. The method as claimed in claim 1 wherein the solid electrolyte forms a monolithic structure spanning the length of at least some of the pores of the porous support.

\* \* \* \* \*